(12) United States Patent
Jones et al.

(10) Patent No.: US 11,958,551 B2
(45) Date of Patent: Apr. 16, 2024

(54) SINGLE PRESS RING GROOVE FOR A CARTRIDGE PIN ASSEMBLY

(71) Applicant: Caterpillar Inc., Peoria, IL (US)

(72) Inventors: Benjamin Isaac Jones, Bartonville, IL (US); Stan Robert Parrott, Chillicothe, IL (US); Allen J. Weeks, Morton, IL (US); George H. Meiner, IV, Morton, IL (US); Scott A. Hudson, Dunlap, IL (US)

(73) Assignee: Caterpillar Inc., Peoria, IL (US)

( * ) Notice: Subject to any disclaimer, the term of this patent is extended or adjusted under 35 U.S.C. 154(b) by 660 days.

(21) Appl. No.: 17/072,312

(22) Filed: Oct. 16, 2020

(65) Prior Publication Data

US 2022/0119051 A1    Apr. 21, 2022

(51) Int. Cl.
*B62D 55/21*    (2006.01)
*B21D 39/02*    (2006.01)
*B62D 55/32*    (2006.01)

(52) U.S. Cl.
CPC ............ *B62D 55/21* (2013.01); *B21D 39/02* (2013.01); *B62D 55/32* (2013.01)

(58) Field of Classification Search
CPC ...... B62D 55/20; B62D 55/205; B62D 55/21; B62D 55/32; B21D 39/02
See application file for complete search history.

(56) References Cited

U.S. PATENT DOCUMENTS

| | | | |
|---|---|---|---|
| 2,823,081 A * | 2/1958 | Mayo | B62D 55/213 305/59 |
| 4,618,190 A * | 10/1986 | Garman | B62D 55/205 305/204 |
| 5,080,406 A | 1/1992 | Hyatt et al. | |
| 5,183,318 A * | 2/1993 | Taft | B62D 55/205 305/192 |
| 5,257,858 A * | 11/1993 | Taft | B62D 55/21 305/204 |
| 6,270,173 B1 | 8/2001 | Hashimoto et al. | |
| 6,564,539 B2 | 5/2003 | Bedford et al. | |
| 2002/0062638 A1 | 5/2002 | Bedford et al. | |
| 2003/0001433 A1 | 1/2003 | Anderton | |
| 2003/0101711 A1* | 6/2003 | Yamamoto | B62D 55/21 59/7 |
| 2008/0073972 A1* | 3/2008 | Mulligan | B62D 55/213 305/203 |
| 2014/0042802 A1* | 2/2014 | Dumitru | B62D 55/21 305/202 |
| 2017/0050688 A1* | 2/2017 | Oertley | B62D 55/092 |

* cited by examiner

*Primary Examiner* — S. Joseph Morano
*Assistant Examiner* — Emily G. Castonguay

(57) ABSTRACT

A swage tool includes a plurality of swage projections that each defines an angular circumferential extent, and the sum of each of these angular circumferential extents is at least 290 degrees.

21 Claims, 14 Drawing Sheets

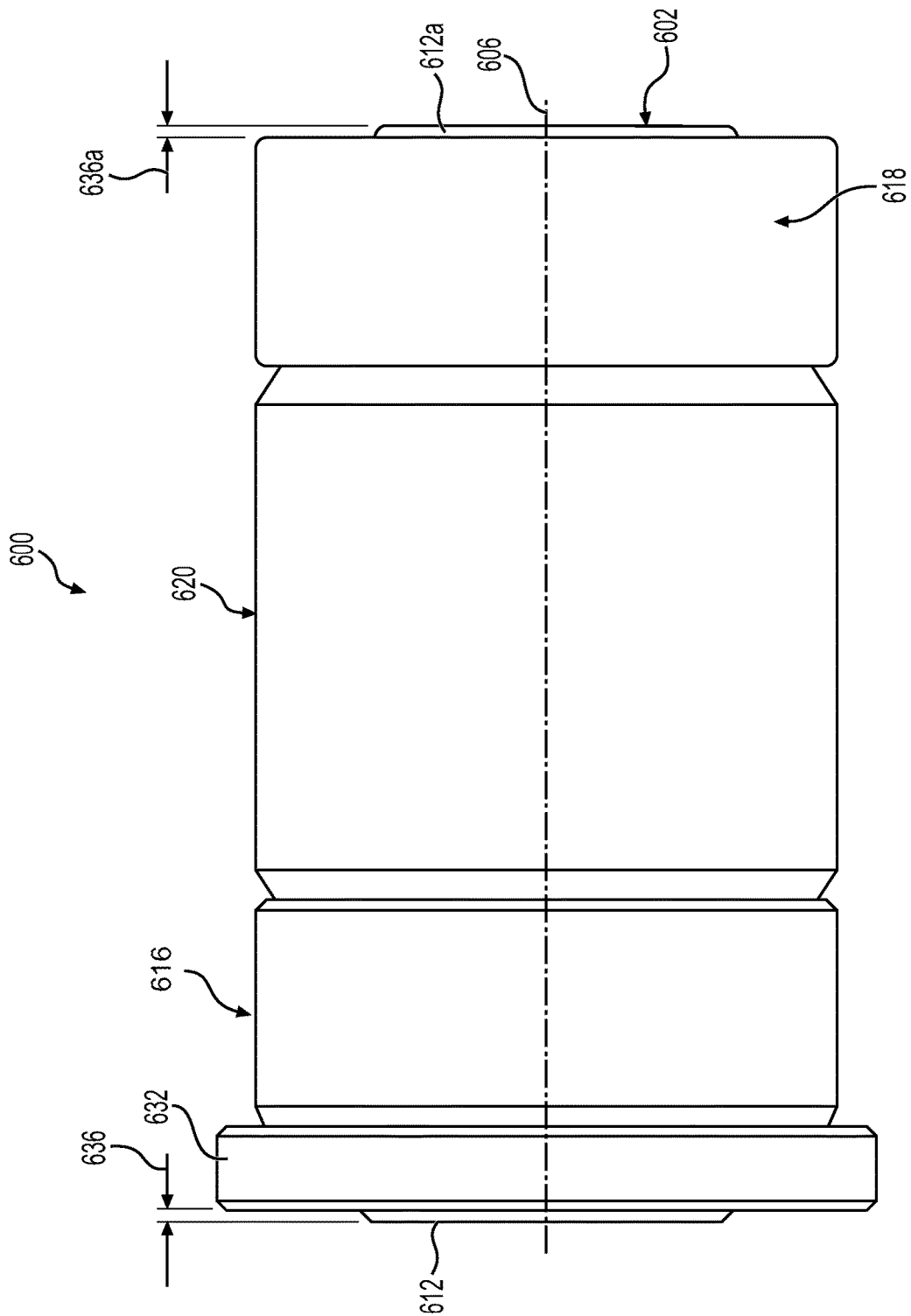

SINGLE PRESS RING GROOVE FOR A CARTRIDGE PIN ASSEMBLY

TECHNICAL FIELD

The present disclosure relates generally to a track chain for use on earthmoving, mining, construction, and other similar machines that employ a tracked undercarriage. Specifically, the present disclosure relates to a track link or an end collar that is connected to a track pin via swaging.

BACKGROUND

In many current applications, track links or end collars, and track pins of track chain assemblies support the weight of heavy equipment such as those using endless track drives in the earth moving, construction, and mining industries, etc. During use, the track link and track pin connection may become strained.

For example, a track joint is often held together by an interference fit between the ends of the track pins and their respective link bores into which the pin ends are tightly received. Even though a very high press force is used to press the links onto their respective pin ends, the links or end collars still have a tendency to move outwardly (sometimes referred to as "walking") on the pin as a result of working forces exerted on the track during operation of a machine. This outward movement may cause the joints to become loose or develop what is commonly referred to as end play. For example, a swaging process is sometimes employed so that the pin or link/end collar are deformed at the pin/link interface so that an undercut that is formed at the interface is filled with material, helping to prevent this "walking" phenomenon.

U.S. Pat. No. 6,270,173 discloses a track chain assembly in which a pair of left and right links are connected by pins respectively press-fitted into the corresponding links, a fixing end surface of the pin or the link is continuously and locally pressed and deformed in an axial direction of the pin from the fixing end surface, along an inner or outer peripheral portion of an opening of pin-press-fit hole. Then, a part of the opening peripheral portion of the end of the pin or the link is enlarged or reduced in diameter, so that the diametrically increased or reduced portion is retained and fixed to a mating retaining space. With this fixing method, it is possible to easily and strongly couple the links and the pin, and to obtain a fixing structure of the links and the pin in the axial direction. When the pin is fixed at the time of assembling of the pin, an existing press can be used without requiring any exclusive machine, and it is possible to easily and reliably assemble the links and the pin to form the track chain assembly. As shown by FIG. 8 of the '173 patent, a plurality of discrete deformed areas that are spaced apart from each other are formed by this method.

The '173 patent does not satisfactorily provide a swaging operation that creates suitable undercuts for prevent the "walking" phenomenon for track chain assemblies that are placed under heavy loads.

SUMMARY

A cartridge pin assembly according to an embodiment of the present disclosure may comprise a pin including a cylindrical surface, a cylindrical axis, a radial direction and a circumferential direction, and an end portion. An annular frustoconical groove may be formed on the cylindrical surface near the end portion that extends 360 degrees along the circumferential direction. An end collar may extend circumferentially 360 degrees about the frustoconical groove, and may axially cover the frustoconical groove. The end collar is deformed such that a deformed amount of material is swaged into the frustoconical groove at least 290 degrees along the circumferential direction.

A swage tool according to an embodiment of the present disclosure may include a body of revolution defining a radial direction, a circumferential direction, and an axis of revolution. The body may also have an outer circumferential surface, a pin receiving cavity that is concentric with the outer circumferential surface, and one or more swage projections that are disposed radially and axially adjacent the pin receiving cavity. The one or more swage projections may include a contact surface that is perpendicular to the axis of revolution. An annular surface may be interposed radially between the one or more swage projections, and the outer circumferential surface. The one or more swage projections may define an angular circumferential extent, and the sum of each of these angular circumferential extents about the axis of revolution may be at least 290 degrees.

A track chain assembly according to an embodiment of the present disclosure may include a plurality of swaged joints. Each joint may comprise a track link, and a cylindrical pin. Each track link may include an inboard end collar with a first bore therethrough, and an outboard end collar with a pin boss extending outwardly therefrom and a second bore therethrough. The boss may including an outer side surface. Each cylindrical pin may define a cylindrical axis, a radial direction, and a circumferential direction, and may include an end portion being pressed and non-rotatably mounted into a respective second bore of the outboard end collar. An annular frustoconical groove may be formed in the end portion of the pin disposed axially and radially adjacent to the pin boss, and the pin boss may have at least one swaged deformation that is disposed in the frustoconcial groove such that the frustoconical groove includes an angular filled undercut portion that extends circumferentially at least 290 degrees about the cylindrical axis.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings:

FIG. 12 is a side view of a cartridge pin assembly having swaged collars according to an embodiment of the present disclosure that is used in a track chain assembly with track pads commonly used by a mining shovel or the like.

DETAILED DESCRIPTION

Figure 1:
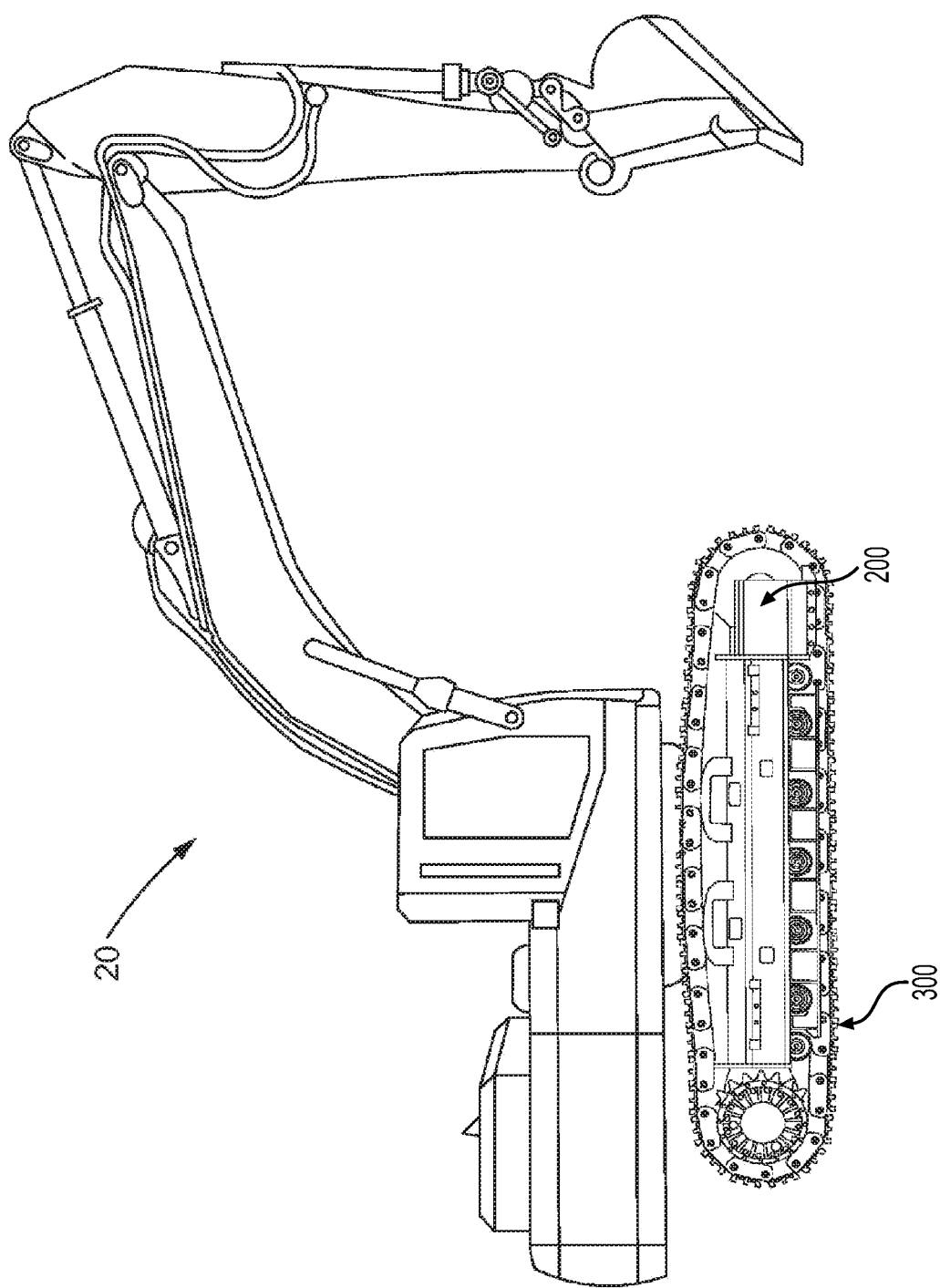
FIG. 1 is a side view of a machine such as an excavator that may employ a track assembly (may also be referred to as an undercarriage assembly) having a cartridge pin assembly that is assembled using a single press ring according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

An apparatus for mechanically connecting joints of an endless track chain for track-type machines to prevent end play in such joints using a swaging process to deform a portion of the pin or link/end collar according to an embodiment of the present disclosure will first be discussed. Then, a swage tool that is constructed according to an embodiment of the present disclosure will then be described. Finally, embodiments of a track chain assembly that may be assembled using the aforementioned embodiments, yielding a more robust track chain assembly that is able to withstand heavy loads will be described.

FIG. 1 shows an embodiment of a tracked machine 20 in the form of an excavator that includes an embodiment of an undercarriage assembly 200 utilizing a track chain assembly 300 constructed in accordance with principles of the present disclosure. Among other uses, an excavator can be used to remove material using a bucket from a work site.

More specifically, FIG. 1 illustrates a machine 20 including an undercarriage system 200 with a track chain assembly 300, consistent with certain embodiments of the present disclosure. It is to be understood that although the machine 20 is illustrated as an excavator, the machine 20 may be of any other type that includes a tracked undercarriage assembly. As used herein, the term "machine" refers to a mobile machine that performs a driven operation involving physical movement associated with a particular industry, such as, earthmoving, construction, landscaping, forestry, mining, agriculture, etc.

While the arrangement is illustrated in connection with an excavator, the arrangement disclosed herein has universal applicability in various other types of machines that employ tracked undercarriage systems, as opposed to wheels. The term "machine" may refer to any machine that performs some type of operation associated with an industry such as mining, earth moving or construction, or any other industry known in the art. For example, the machine may be a hydraulic mining shovel, a cable shovel, a track type tractor, a dozer, or dragline or the like. Moreover, one or more implements may be connected to the machine. Such implements may be utilized for a variety of tasks, including, for example, lifting and loading.

Figure 2:
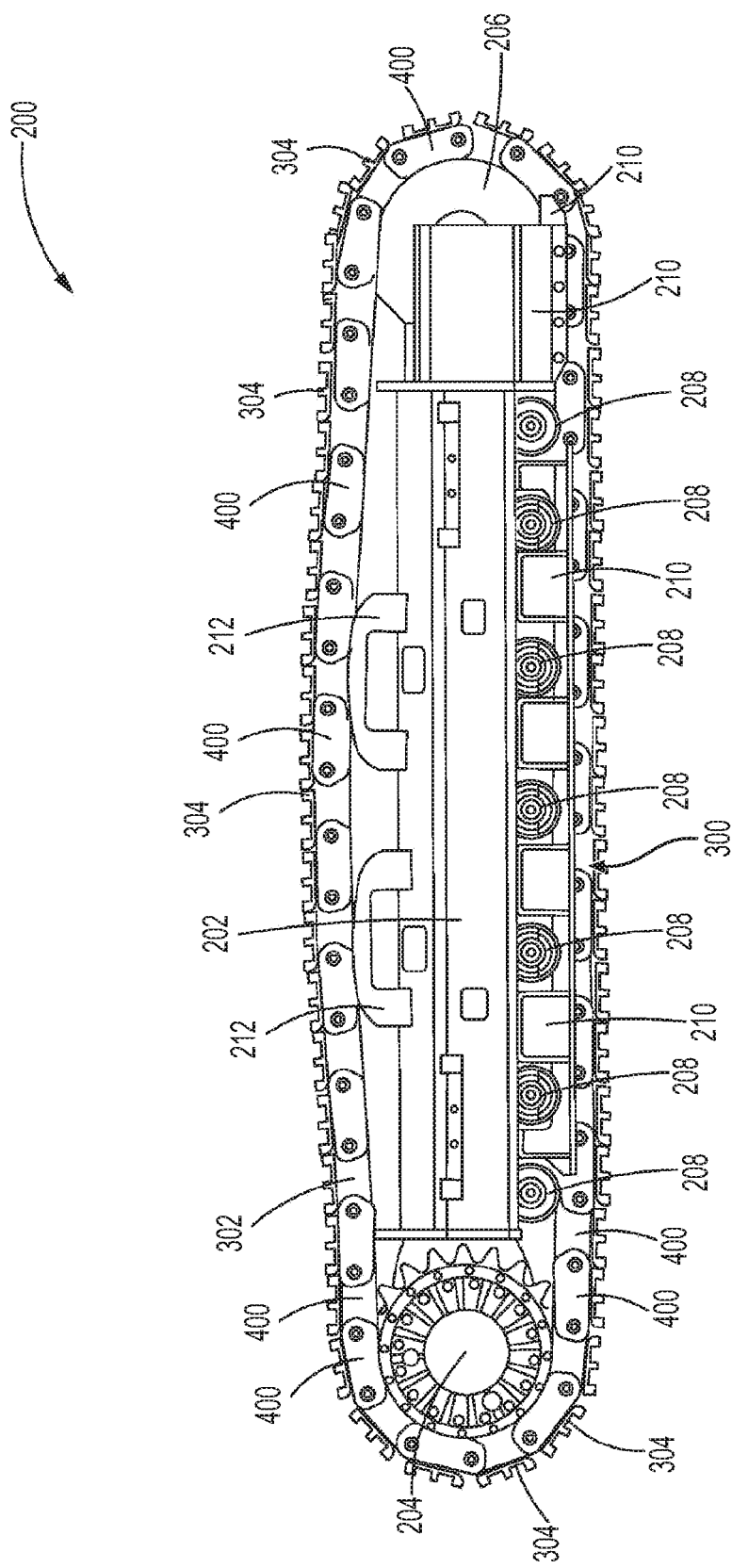
FIG. 2 is a side view of the undercarriage assembly for the machine of FIG. 1.
Figure 3:
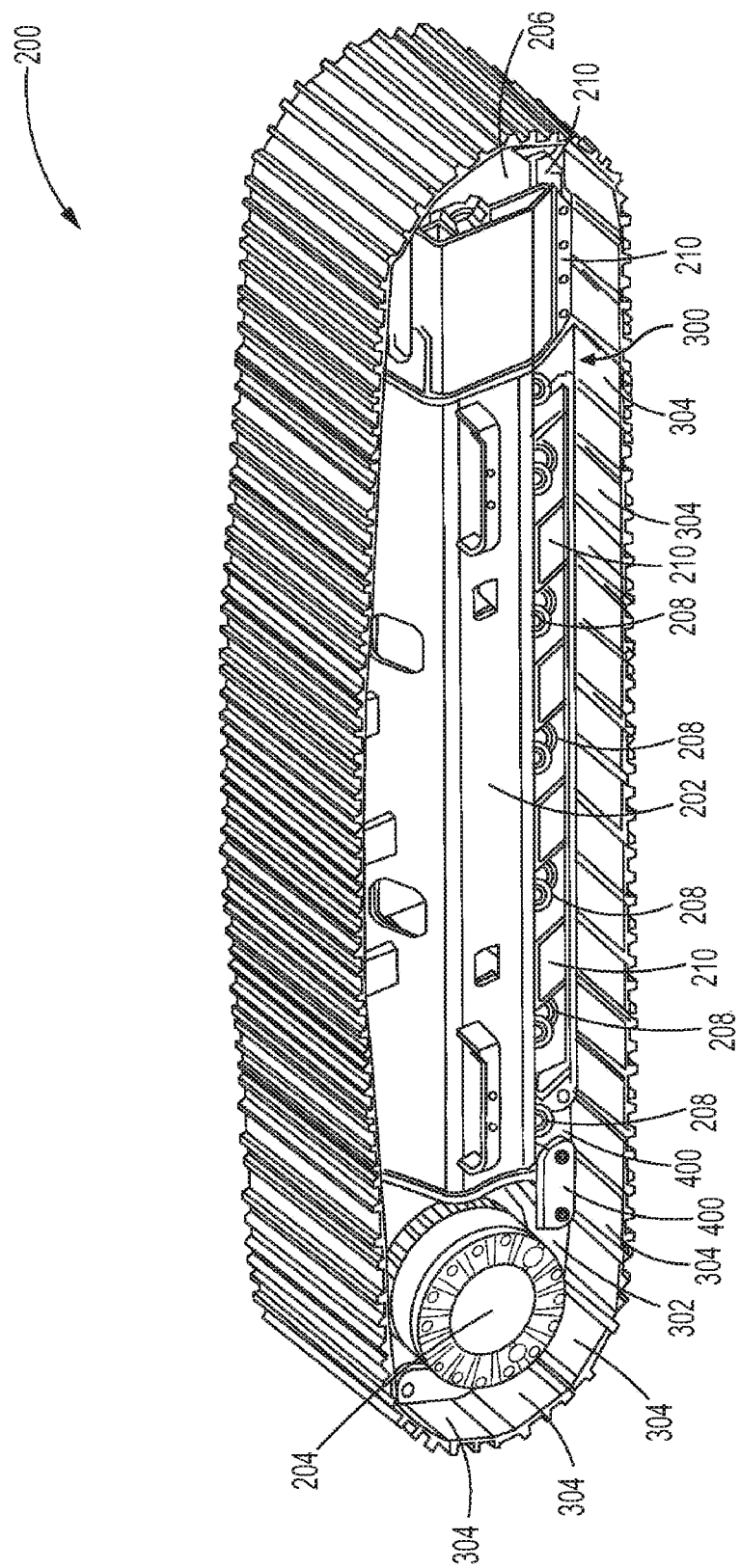
FIG. 3 is a perspective view of the undercarriage assembly of FIG. 2.

The undercarriage assembly 200 may be configured to support the machine 20 and move the machine 20 along the ground, road, and other types of terrain. In addition, high payload weights may be exerted on the track chain assembly 300. As shown in FIGS. 2 and 3, the undercarriage assembly 200 may include a track roller frame 202, various guiding components connected to the track roller frame 202, and an endless track such as a track chain assembly 300 engaging the guiding components. The guiding components may guide the track chain assembly 300 and include a drive sprocket 204, an idler 206, track rollers 208, track guides 210, and carriers 212 (or carrier rollers 212' as shown in FIG. 4), although other components may be used and some of the aforementioned components may be omitted in other embodiments, etc.

Figure 4:
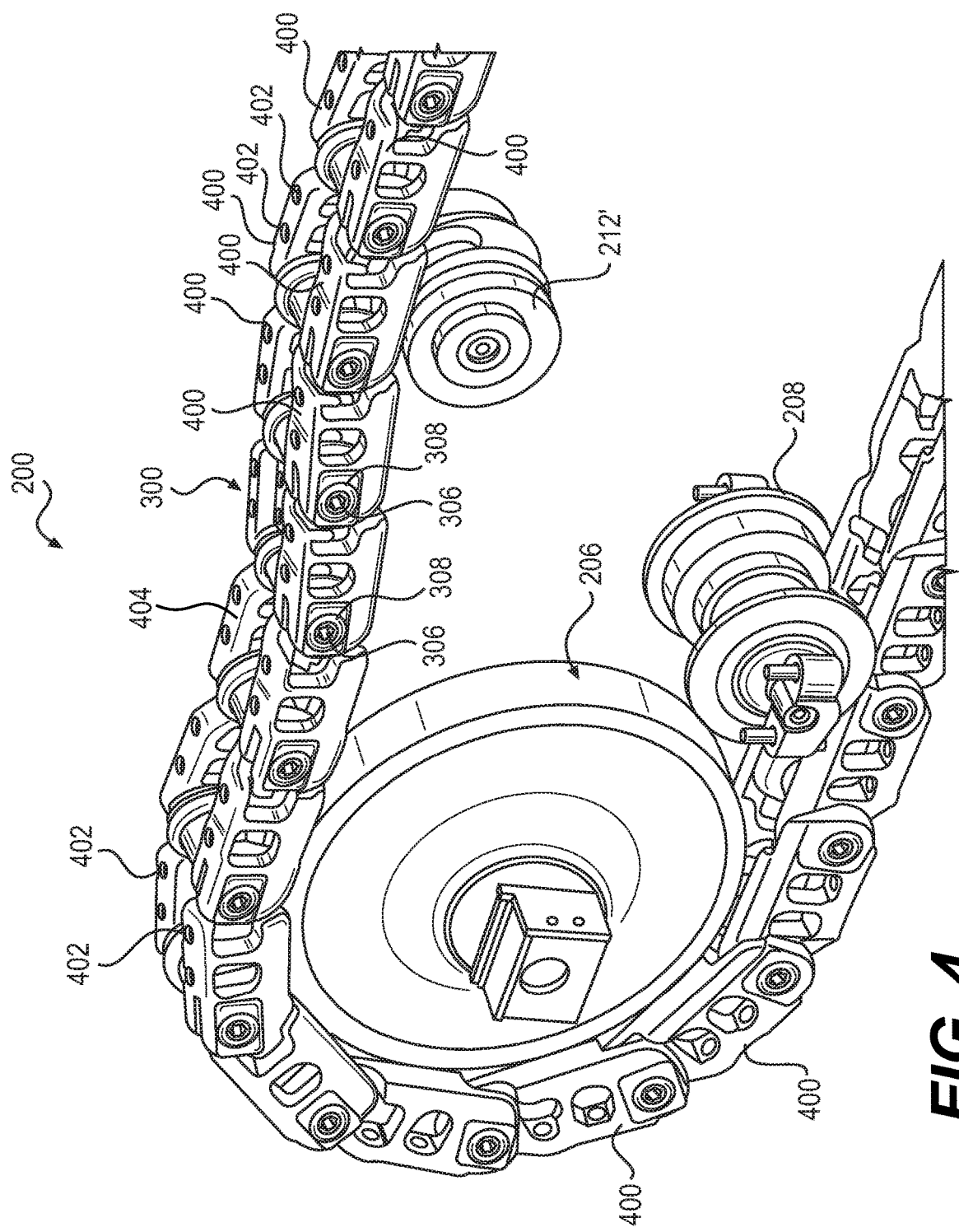
FIG. 4 is a perspective view of a track chain assembly mating with a track roller, carrier roller, and idler removed from the undercarriage assembly of FIG. 3 according to an embodiment of the present disclosure.
Figure 5:
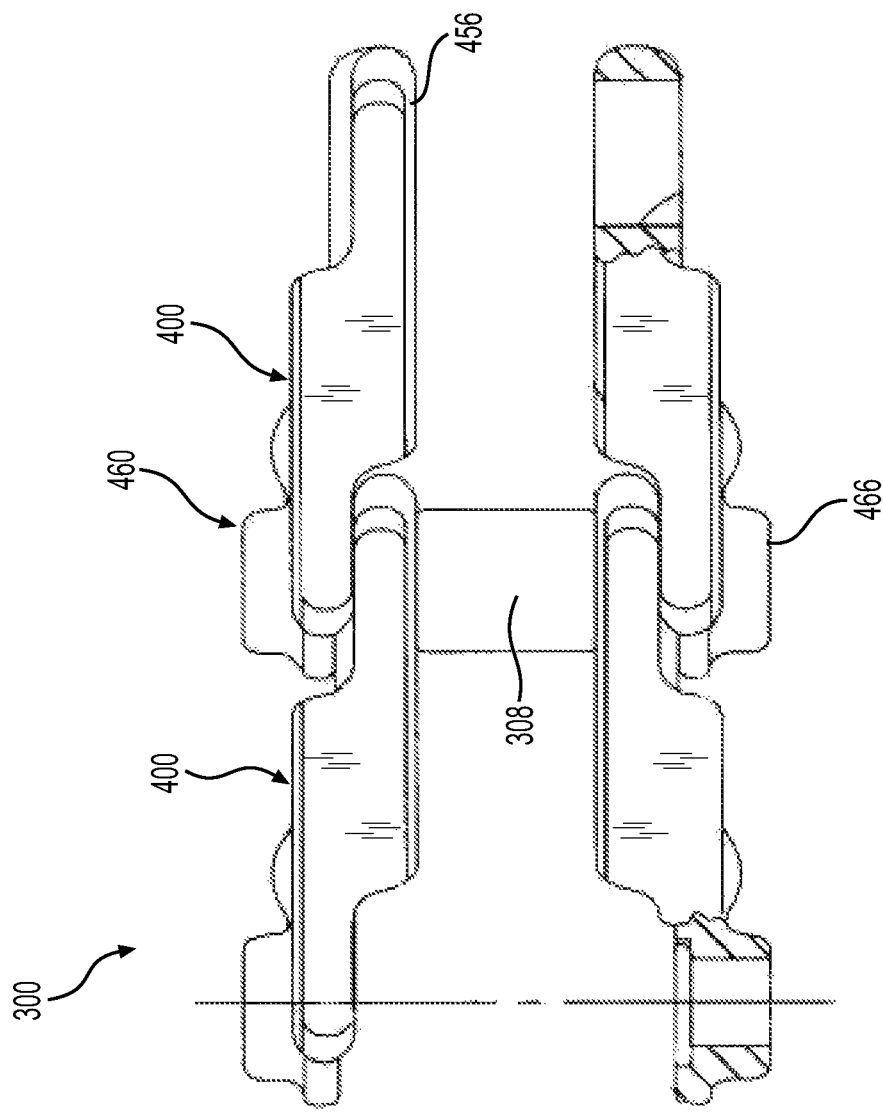
FIG. 5 is a top view the track chain assembly of FIG. 4 shown in isolation.

Looking at FIGS. 3 and 4 together, the track chain assembly 300 may include a link assembly 302 with a plurality of shoes 304 secured thereto. The link assembly 302 may form a flexible backbone of the track chain assembly 300, and the shoes 304 may provide traction on the various types of terrain. The link assembly 302 may extend in an endless chain around the drive sprocket 204, the track rollers 208, the idler 206, and the carriers 212 or carrier rollers 212'.

The track shoes 304 may be secured to the perimeter of link assembly 302. For example, one shoe 304 may be attached to each laterally spaced pair of the track links 400. The track shoes 304 may be connected to the track links 400 via various methods (e.g. welding, fastening, etc.). To that end, fastening holes 402 may be provided on the bottom surfaces 404 (see FIG. 4) of the track links 400.

Starting with FIG. 4, an embodiment of an undercarriage assembly 200 according to the principles of the present disclosure will now be described.

The undercarriage assembly 200 may comprise a track chain assembly 300 including a plurality of track pins 306 and track bushings 308 disposed about the track pins 306. Also, a plurality of track links 400 that are connected to each other by either a track pin 306 or a track bushing 308.

Turning now to FIGS. 5 thru 11, an apparatus for mechanically connecting joints of an endless track chain (e.g. track chain assembly 300) for track-type machines (e.g. machine 20) to prevent end play in such joints according to an embodiment of the present disclosure will now be discussed.

Figure 6:
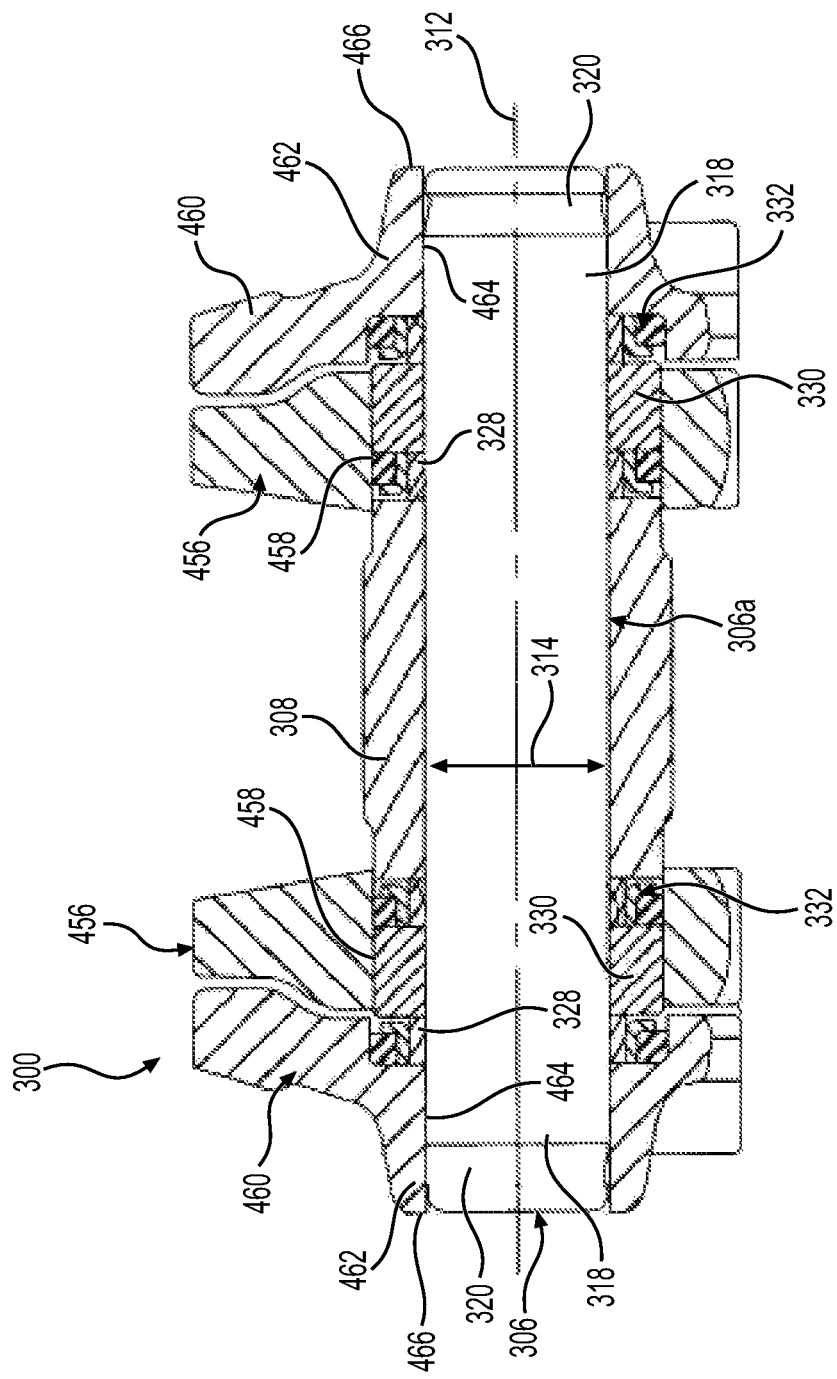
FIG. 6 is side sectional view of the track chain assembly of FIG. 5 taken along lines 6-6 thereof through a hinge joint.
Figure 7:
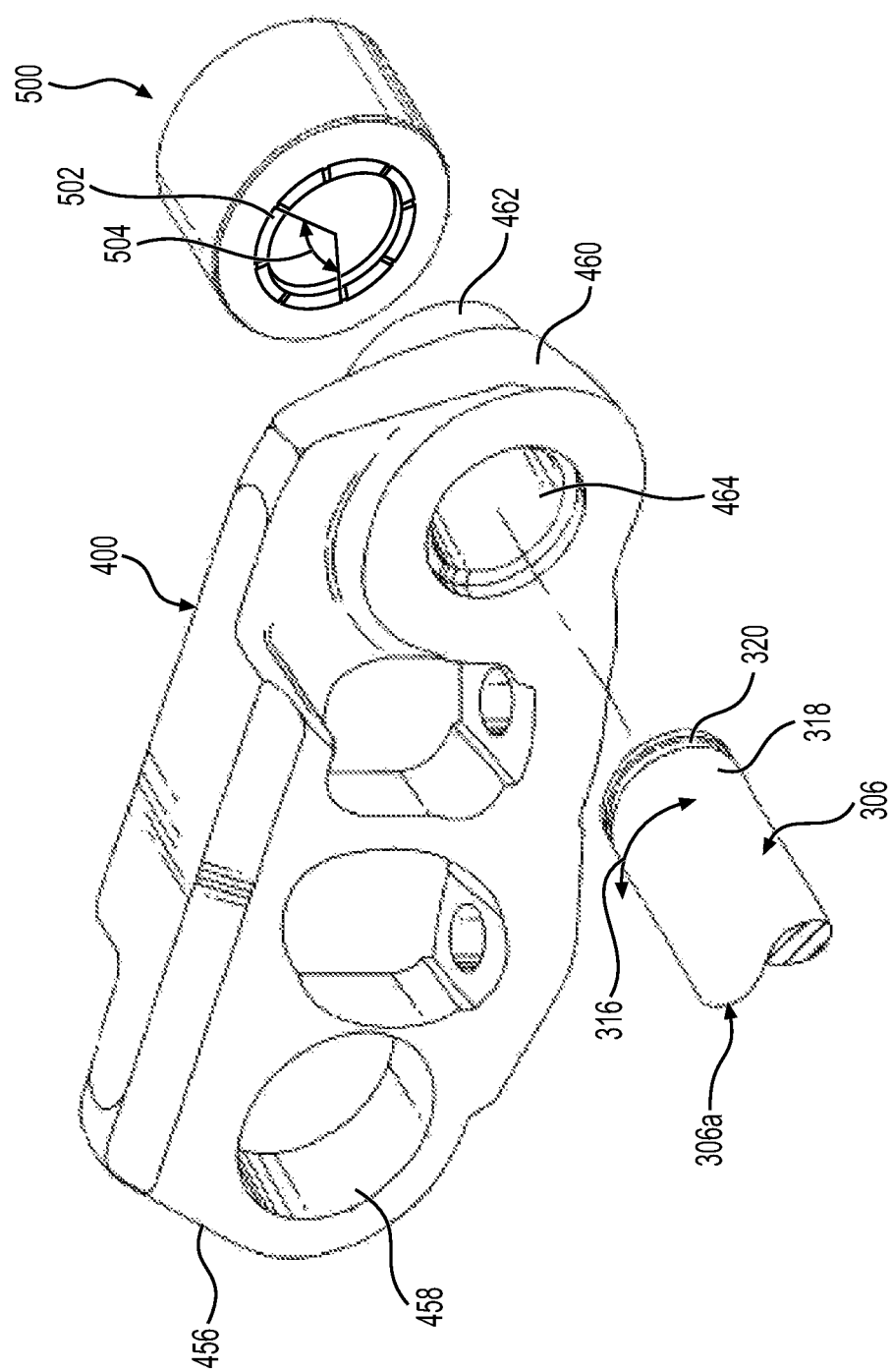
FIG. 7 is an exploded view showing a track link, a swage tool and a track pin according to an embodiment of the present invention.

Each joint may include a track link 400, and a track pin 306 (e.g. may be conical or cylindrical, etc.) defining an axial direction 312 (see FIG. 6), a radial direction 314, and a circumferential direction 316 (see FIG. 7). Each link 400 may include an inboard end collar 456 with a first bore 458 therethrough, and an outboard end collar 460 with a pin boss 462 extending outwardly therefrom and a second bore 464 therethrough. The boss 462 may include an outer side surface 466, while the pin 306 may include an end portion 318 that may be pressed and non-rotatably mounted into a respective second bore 464 of the outboard end collar 460.

Also as shown in FIG. 7, an annular frustoconical groove 320 may be formed in the end portion of the pin 318 (on the circumferential surface of the shaft of the pin) that is disposed axially and radially adjacent to the pin boss 462. A swage tool 500 may also be provided that includes a swage segment 502 that extends an angle 504 that is at least 290 degrees along the circumferential direction 316 (e.g. see FIG. 10).

Figure 9:
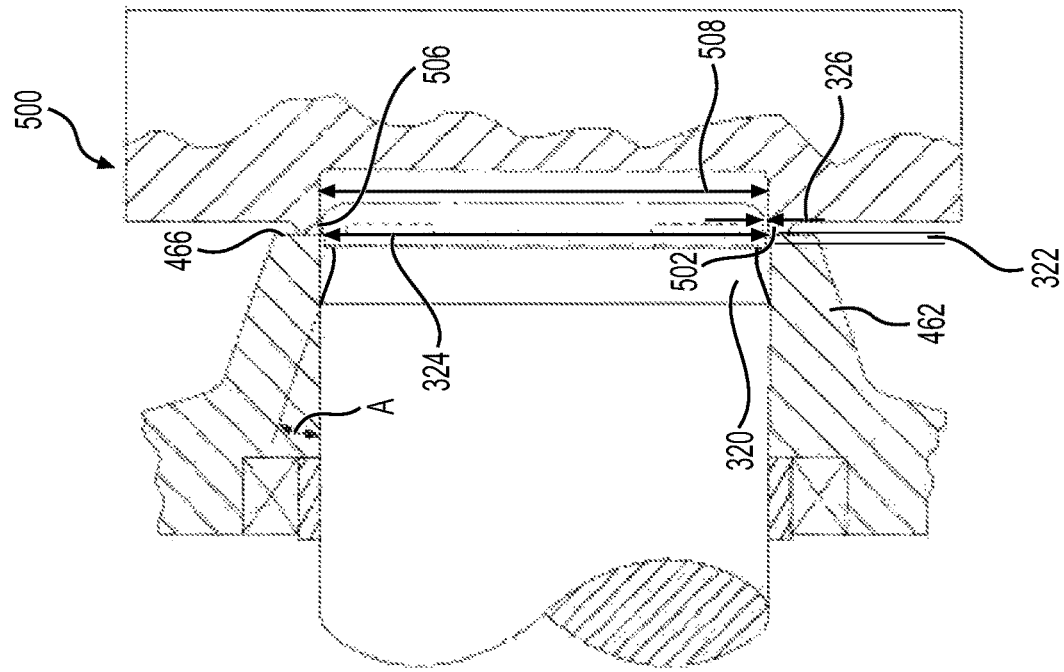
FIG. 9 is a sectional side view of one of the joints showing the unswaged structure.
Figure 8:
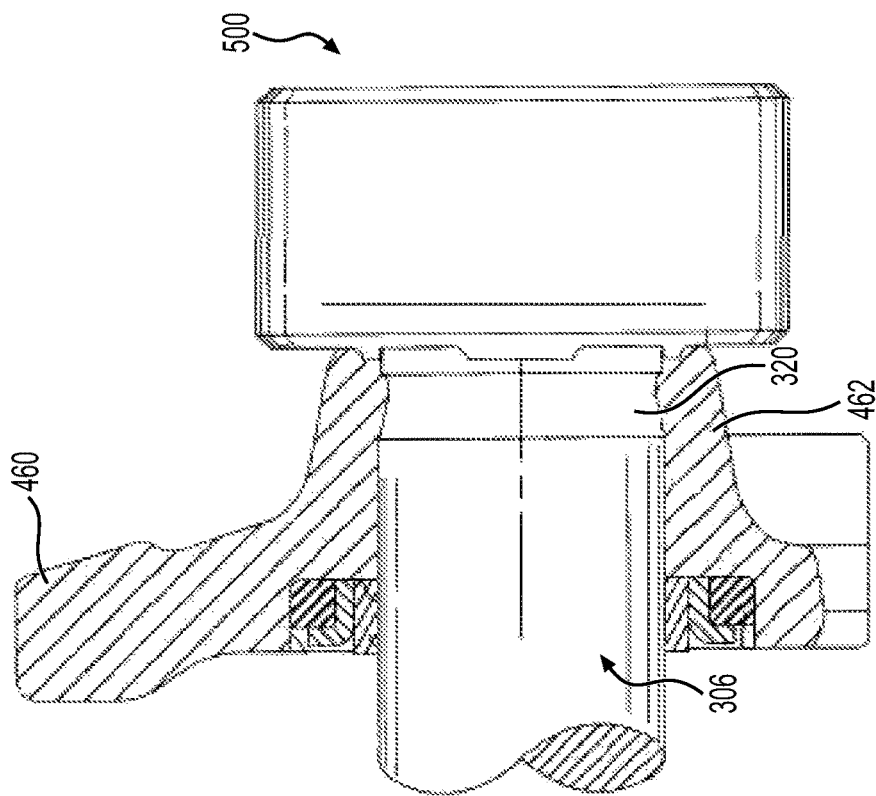
FIG. 8 is a partial side sectional view of one of the joints shown in FIG. 6, illustrating structure for mechanically interlocking the pin to the link.

Looking at FIGS. 9 and 111 together, it may be understood that the swage segment 502 may contact the outer side surface 466 of the pin boss 462, and the swage element 502 may extend extends at an angle 504 that is least 325 degrees along the circumferential direction 316. The outer side surface 466 defines an outer side surface area, while the swage element 502 defines a swage element contact surface area that is less than the outer side surface area (see FIG. 9). In certain embodiments, the swage element contact surface area is greater than 40% of the outer side surface area. This may not be the case in other embodiments of the present disclosure As best seen in FIG. 9, the frustoconical groove 320 defines an axial taper A of less than 15 degrees. In addition, the pin boss 462 may overlap the frustoconical groove an axial distance 322 that ranges from 0.05 mm to 3.0 mm. The swage segment 502 may include an inner circumferential surface 506 defining a predetermined diameter 508, whereas the pin 306 may define a pin diameter 324 that is less than the predetermined diameter 508 of the inner circumferential surface 506 of the swage segment 502, being radially offset by a distance 326 that is greater than 0 mm but less than or equal to 3.0 mm. These features and dimensions may be differently configured in other embodiments of the present disclosure.

Figure 11:
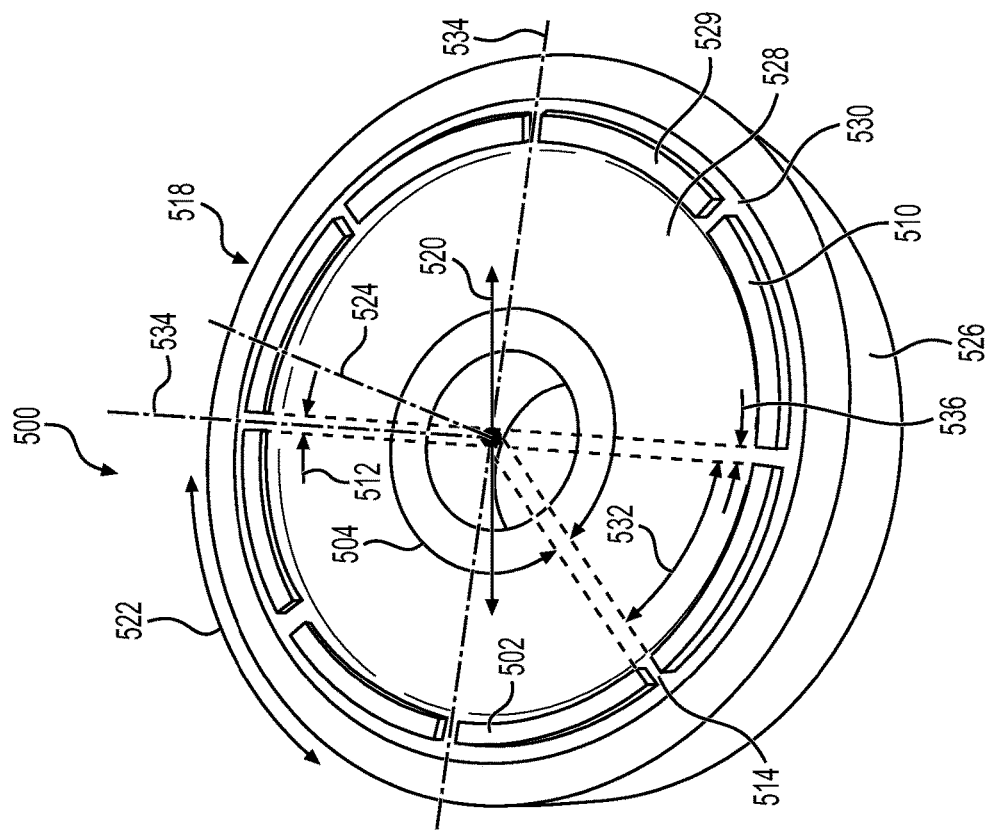
FIG. 11 is a front view of the swage tool of FIGS. 7 thru 10.

Referring to FIG. 11, the swage segment 502 is split into a plurality of swage projections 510 that are spaced circumferentially away from each other a predetermined angle 512, forming an extrusion limiting surface 514 between each of the plurality of swage projections 510. This extrusion limiting surface 514 is so called because during the swaging process, the pin boss 462 is deformed inwardly into the groove 320 of the pin 306, but some material will expand axially toward the swage tool 500. This surface 514 limits this axial expansion, helping to force material flow into the groove 320 while also reducing the amount of press force necessary. This predetermined angle 512 may range from 2.0 degrees to 10.0 degrees in various embodiments of the present disclosure. In addition, each of the plurality of swage projections 510 may define a radial thickness 516 that ranges from 0.5 mm to 1.0 mm (e.g. 0.7 mm), and an axial height 518 (see FIG. 10) that ranges from 0.4 mm to 0.8 mm (0.6 mm).

Any of the aforementioned features may be differently configured or be differently dimensioned than what has been specifically described herein in other embodiments of the present disclosure.

Now a swage tool 500 that may be supplied to be used in the field or at the factory will now be discussed with reference to FIG. 11. The swage tool 500 may include a body of revolution 518 (e.g. cylindrical, conical, etc.) that defines a radial direction 520, a circumferential direction 522, and an axis of revolution 524. The "body of revolution", and the "axis of revolution" are so called since the body may be at least partially modeled in CAD (computer aided drafting) by rotating geometry about the axis of revolution, and/or may be at least partially manufactured using a turning process such as on a lathe or other similar equipment, etc. This may not be the case for other embodiments of the present disclosure. When used on a track chain assembly, the process may include swaging multiple teeth at the factory, perform a bushing turn, then use the full ring swage tool after the service cycle.

Figure 16:
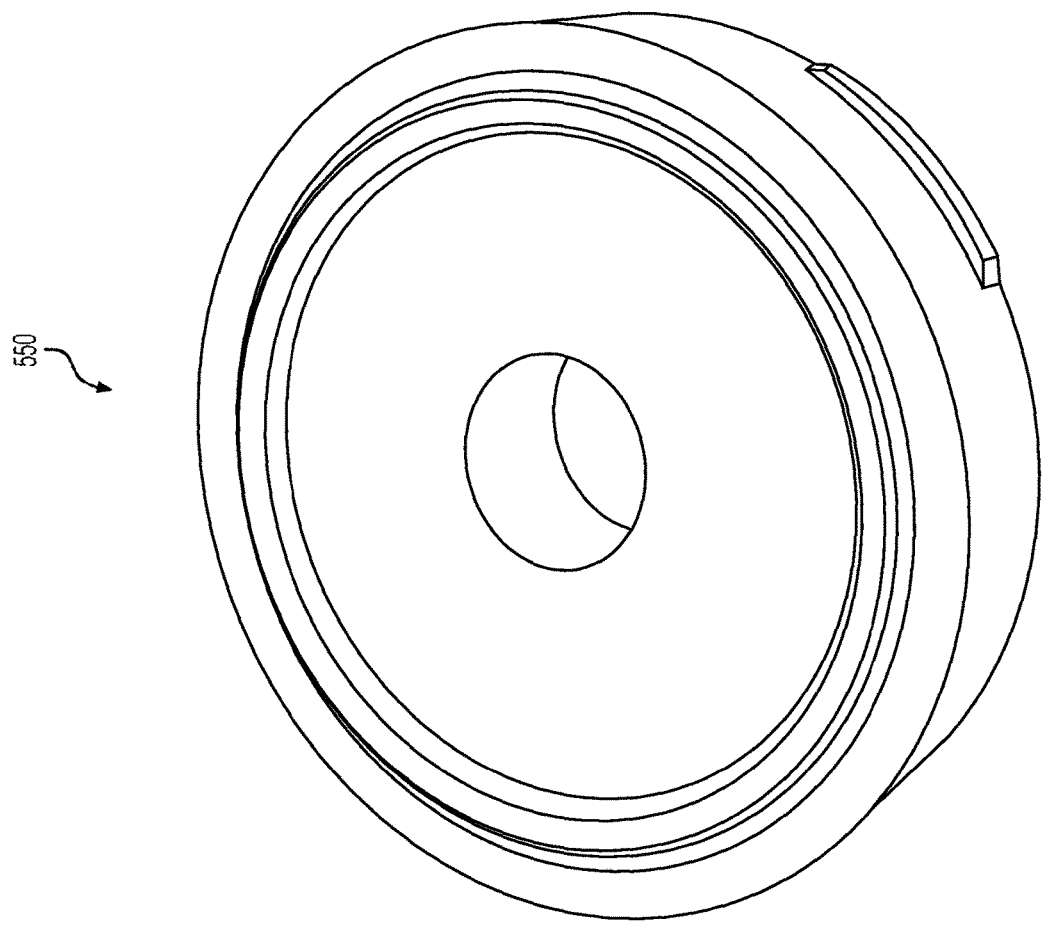
FIG. 16 is a front view of a swage tool according to another embodiment of the present disclosure where a single swage protrusion extends 360 degrees about cylindrical axis of the swage tool. This swage tool may be used on a cartridge pin assembly or a track chain assembly such as shown in FIGS. 7 thru 10, etc.

The body 518 may include an outer circumferential surface 526, and a pin receiving cavity 528 that is concentric with the outer circumferential surface 526. A plurality of swage projections 510 (i.e. one or more swage projections) may be disposed radially and axially the pin receiving cavity 528, and each of the plurality of swage projections 510 may include a contact surface 529 that is perpendicular to the axis of revolution 524. An annular surface 530 may be interposed radially between the plurality of swage projections 510, and the outer circumferential surface 526. Each of the swage projections 510 defines an angular circumferential extent 532, and the sum of each of these angular circumferential extents 532 is at least 290 degrees, and may be at least 325 degrees ins some embodiments (or even 360 degrees using a wage tool such as shown in FIG. 16).

Looking at FIG. 11, the body 518 may be divided into quadrants (90 degrees each) about the axis of revolution 524, and two identically configured swage projections 510 may be disposed in each of the quadrants.

More specifically, one of the swage projections 510 in one quadrant maybe spaced away circumferentially from the swage projection in another quadrant by an angle 536 that is 10 degrees or less (e.g. may be 5 degrees or less) in some embodiments. Also, the two identically configured swage projections 510 in each quadrant may be spaced away from each other by an angle 538 that is 10 degrees or less, or even 5 degrees or less.

As alluded to earlier herein above, the body of revolution 518 may be an at least partially cylindrical body. Accordingly, the axis of revolution 518 in such a case may also be a cylindrical axis.

Figure 10:
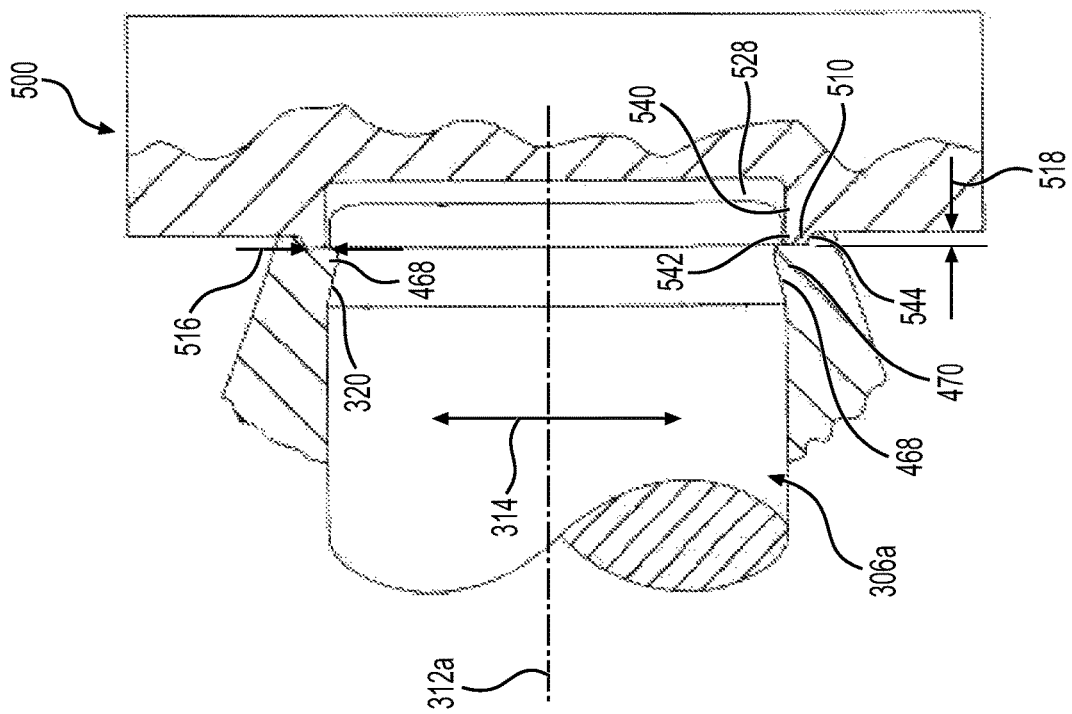
FIG. 10 is a sectional side view of one of the joints showing the swaged structure.

Focusing on FIG. 10, the pin receiving cavity 528 may define a concave circumferential surface 540, and each of the plurality of swage projections 510 may include a radially inner surface 542 that extends axially from the contact surface 529 that also at least partially forms the concave circumferential surface 540. This may not be the case in other embodiments Likewise, each of the plurality of swage projections 510 may include a radially outer surface 544 that extends from the contact surface 529 to the annular surface 530. This radially outer surface 544 may be tapered relative to the axis of revolution in order to buttress the swage projection when forcing material into the groove of the pin during the swaging process.

Due to the size, number, and spacing of the swage projections, a single swaging process may substantially or completely fill the undercut formed by the groove of the pin so that the groove is filled almost 360 degrees. As a result, less time is needed to create a more robust connection that is able to withstand higher loads. As will be discussed momentarily herein, the swage projection and the deformation may extend a full 360 degrees in some embodiments using a swage tool 550 such as shown in FIG. 16.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

For many embodiments, the track link, the swage tool, and/or the pin, or any of the components of the cartridge pin assembly that will be discussed momentarily may be manufactured using iron, grey-iron, steel or other suitable materials. Other materials may be used as well as other manufacturing processes to make these components. Also, the configurations of any of the features discussed herein, as well as their dimensions, and/or their ratios of dimensions may be different than what has been specifically stated herein depending on the intended application.

INDUSTRIAL APPLICABILITY

In practice, a track link, a track chain assembly, a pin, an end collar, a cartridge pin assembly, and/or a swage tool according to any embodiment described herein may be sold, bought, manufactured or otherwise obtained in an OEM (Original Equipment Manufacturer) or after-market context.

The various embodiments described herein may improve the life of the track chain assembly and/or cartridge pin assembly when employed in an undercarriage assembly by allowing the pin/link and/or pin/end collar connections to be more robust and to withstand heavier loads before "walking" occurs.

In particular, such a track chain assembly may be characterized as follows looking at FIGS. 5, 7, 10, and 11.

The track chain assembly 300 may include a plurality of swaged joints, each joint comprising a track link 400 and a cylindrical pin 306a. The track link 400 may include an inboard end collar 456 with a first bore 458 therethrough, and an outboard end collar 460 with a pin boss 462 extending outwardly therefrom and a second bore 464 therethrough. The boss 462 may include an outer side surface 466.

The cylindrical pin 306a may define a cylindrical axis 312a, a radial direction 314, and a circumferential direction 316, and may include an end portion 318 that is pressed and non-rotatably mounted into a respective second bore 464 of the outboard end collar 460 of the link 400.

An annular frustoconical groove 320 may be formed in the end portion 318 of the pin disposed axially and radially adjacent to the pin boss 462, and the pin boss 462 has at least one swaged deformation 468 that is disposed in the frustoconcial groove 320 such that the frustoconical groove 320 includes an angular filled undercut portion 470 that extends circumferentially at least 290 degrees about the cylindrical axis 312a.

The at least one swaged deformation may be split into a plurality of swaged deformations 468 that are spaced circumferentially apart from each other, and the angular filled undercut portion 470 may extend at least 325 degrees about the cylindrical axis.

Other components of the track chain assembly 300 may include thrust rings 328, sleeve bearings 330, and seal assemblies 332 (e.g. see FIG. 6).

In another embodiment, a track chain assembly may be provided for use with a hydraulic mining shovel, electric rope shovel or the like such as that disclosed in U.S. Pat. Application Publ. No. 2019/0283818 A1 and 2019/0283818 A1 commonly owned by the Assignee of the present application. The track chain assembly in such applications may comprise a plurality of track pads linked together by a plurality of cartridge pin assemblies.

Figure 13:
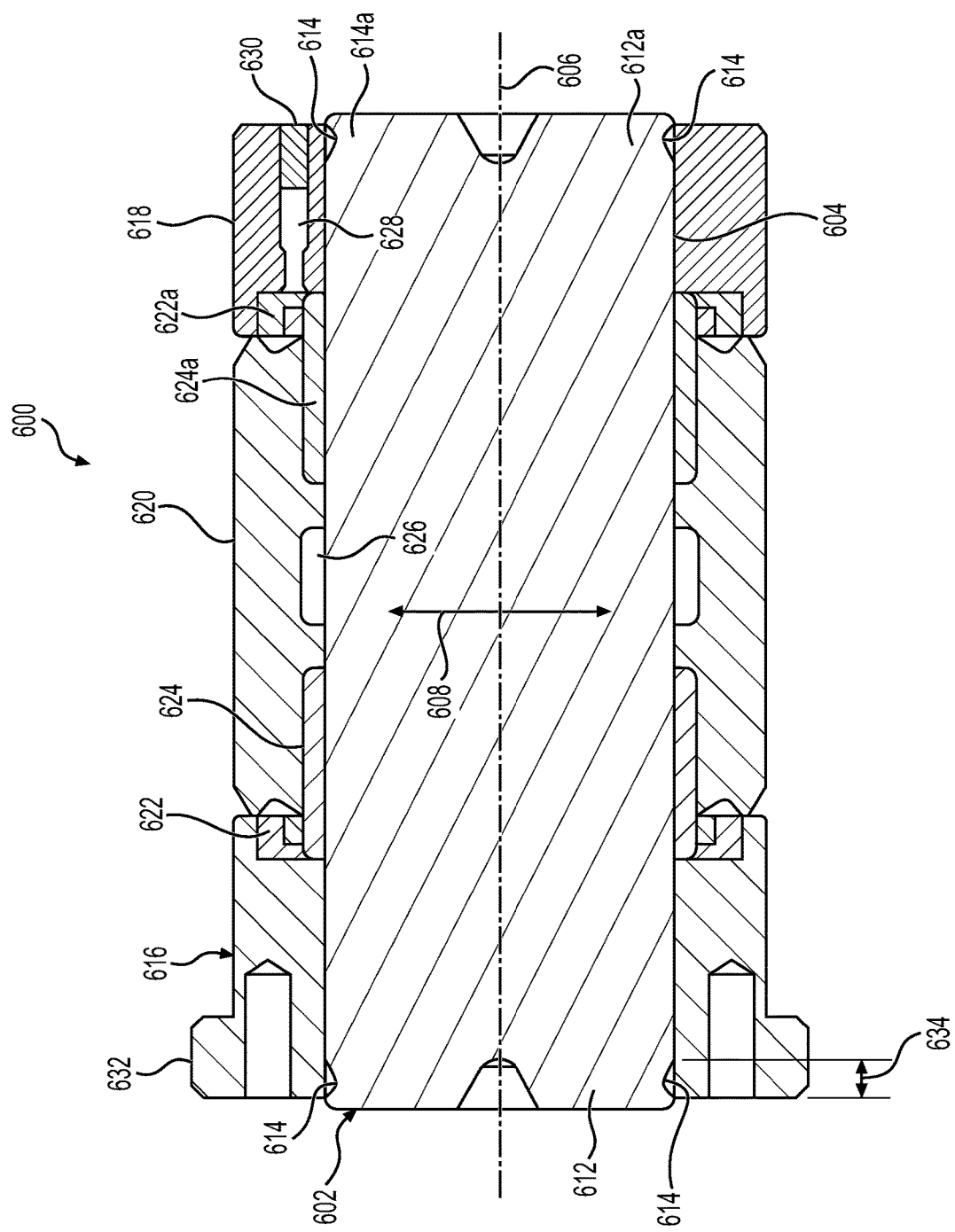
FIG. 13 is a side sectional view of the cartridge pin assembly of FIG. 12, revealing the inner components and overall structure of the assembly.
Figure 14:
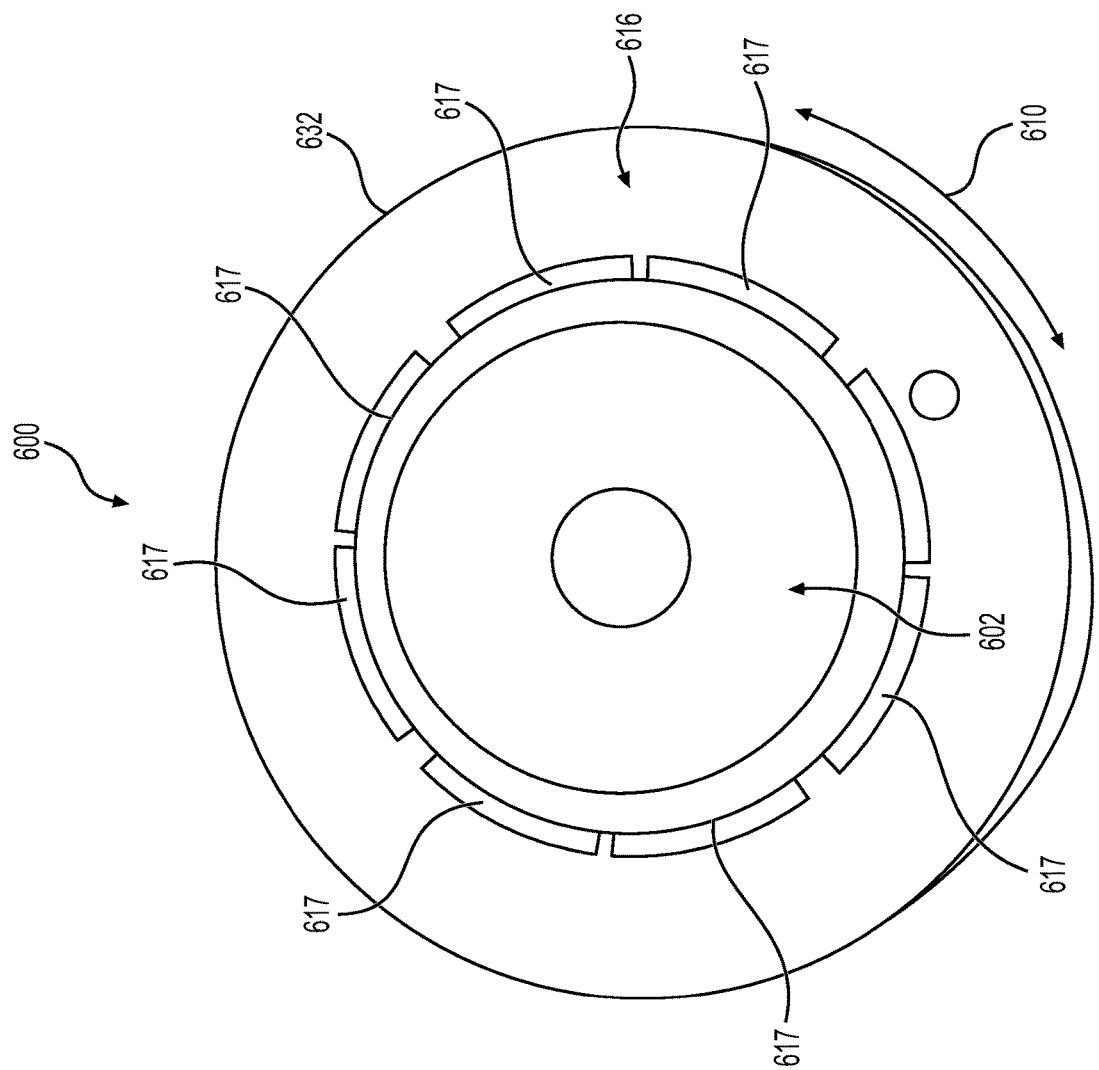
FIG. 14 is a left side end view of the cartridge pin assembly of FIG. 13, showing the collar swaged by the swage tool of FIG. 11.
Figure 15:
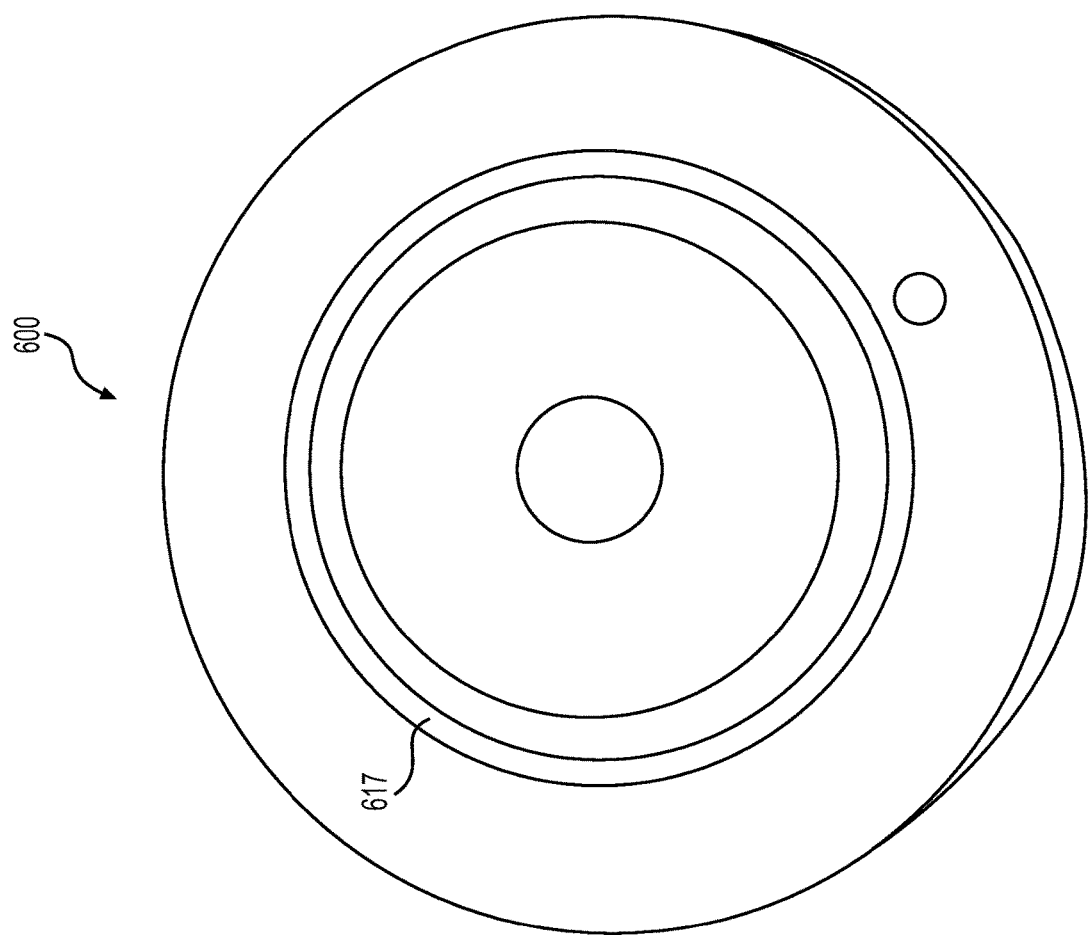
FIG. 15 is a left side end view of the cartridge pin assembly of FIG. 13, showing the collar swaged by the swage tool of FIG. 16.

Turning now to FIGS. 12 thru 15, such a cartridge pin assembly 600 will be described. The assembly 600 as best shown in FIG. 13 may comprise a pin 602 including a cylindrical surface 604, a cylindrical axis 606, a radial direction 608 and a circumferential direction 610 (see FIG. 14). The pin 602 may also have an end portion 612, and an annular frustoconical groove 614 (similarly or identically configured as the groove shown in FIG. 9) formed on the cylindrical surface 604 near the end portion 612 that extends 360 degrees along the circumferential direction 610.

An end collar 616 may extend circumferentially 360 degrees about the frustoconical groove 614, and may axially cover the frustoconical groove 614. The end collar 616 may be deformed via a swaging tool such that a deformed amount of material 617 (see FIG. 14) is swaged into the frustoconical groove 614 at least 290 degrees along the circumferential direction 610. In other embodiments, this may vary to be greater than 320 degrees, 345 degrees, or as much as 360 degrees (see FIG. 15). The end collar 616 may also include a shoulder portion 632, but not necessarily so.

Similarly as best seen in FIG. 13, the cartridge pin assembly 600 may further comprise an opposite end portion 612a of the pin 602 having an additional frustoconical groove 614a formed on the cylindrical surface 604 near the opposite end portion 612a. An opposite end collar 618 may extend circumferentially 360 degrees about the additional frustoconical groove 614a and may axially cover the additional frustoconical groove 614a. The opposite end collar 618 may also be deformed such that a deformed amount of material is swaged into the additional frustoconical groove 614a at least 290 degrees along the circumferential direction 610.

The cartridge pin assembly 600 may also have a bushing 620 that is disposed axially between the end collar 616, and the opposite end collar 618, as well as circumferentially about the pin 602. A first seal assembly 622 may be disposed axially between the bushing 620 and the end collar 616, while a second seal assembly 622a may be disposed axially between the bushing 620 and the opposite end collar 618. A first sleeve bearing 624 may be disposed axially between the end collar 616 and the bushing 620, and circumferentially about the pin 602. Also, a second sleeve bearing 624a may be disposed axially between the opposite end collar 618 and the bushing 620, and circumferentially about the pin 602.

As shown in FIG. 13, the first seal assembly 622 extends circumferentially about the first sleeve bearing 624, while the second seal assembly 622a extends circumferentially about the second sleeve bearing 624a. Moreover, the bushing 620 may define a lubrication groove 626 that extends circumferentially about the pin 602, and that is disposed axially between the first sleeve bearing 624, and the second sleeve bearing 624a. The opposite end collar 618 includes a lubrication bore 628 that extends axially therethrough with a stopper 630 disposed therein. When the stopper is removed, lubrication may be injected into the internal cavity of the assembly reaching the seal assemblies and the lubrication groove, etc.

In particular embodiments, the end collar 616 overlaps the frustoconical groove 614 a minimum axial distance 634 that ranges from 0.05 mm to 3.0 mm. This may not be the case for other embodiments of the present disclosure.

During the assembly process, and/or after the swaging process, the end portion 612 of the pin 602 may extend axially past the end collar 616 a first predetermined distance 636 (see FIG. 12), and the opposite end portion 612a of the pin 602 may extend past the opposite end collar 618 a second predetermined distance 636a that is within 0.2 mm of the first predetermined distance 636. This may help to ensure that the pin is centered with respect to the assembly. This may not the case for other embodiments of the present disclosure.

More specifically, the first predetermined distance 636 and the second predetermined distance 636a may range from 2.6 mm to 2.8 mm (e.g. 2.7 mm).

A pressing machine that is available may be used to perform any swaging process for any embodiment described herein. In some cases, a press force ranging from 100 tons to 150 tons may be employed to swage one area using one swage tool. In other embodiments, such as for swaging the cartridge pin assembly, the press tonnage may be greater such as ranging from 133 tons to 200 tons.

Any of the aforementioned dimensions may be varied to be different than specifically stated herein in other embodiments of the present disclosure.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A cartridge pin assembly comprising:
a pin including a cylindrical surface, a cylindrical axis, a radial direction and a circumferential direction, and an end portion, and an annular frustoconical groove formed on the cylindrical surface adjacent to the end portion that extends 360 degrees along the circumferential direction; and
an end collar that extends circumferentially 360 degrees about the annular frustoconical groove, and axially covers the annular frustoconical groove;
wherein the end collar is deformed such that a deformed amount of material is continuously swaged into the annular frustoconical groove of the pin, the deformed amount of material of the end collar mechanically locking at least 290 degrees, as measured along the circumferential direction of the pin within the end collar.

2. The cartridge pin assembly of claim 1, further comprising:
an opposite end portion of the pin having an additional frustoconical groove formed on the cylindrical surface adjacent to the opposite end portion; and
an opposite end collar that extends circumferentially 360 degrees about the additional frustoconical groove, and axially covers the additional frustoconical groove;
wherein the opposite end collar is deformed such that a deformed amount of material is swaged into the additional frustoconical groove at least 290 degrees along the circumferential direction.

3. The cartridge pin assembly of claim 2, further comprising;
a bushing disposed axially between the end collar and the opposite end collar, and circumferentially about the pin;
a first seal assembly disposed axially between the bushing and the end collar;
a second seal assembly disposed axially between the bushing and the opposite end collar;
a first sleeve bearing disposed axially between the end collar and the bushing, and circumferentially about the pin; and
a second sleeve bearing disposed axially between the opposite end collar and the bushing, and circumferentially about the pin;
wherein the first seal assembly extends circumferentially about the first sleeve bearing, and the second seal assembly extends circumferentially about the second sleeve bearing.

4. The cartridge pin assembly of claim 3, wherein the bushing defines a lubrication groove that extends circumferentially about the pin, and that is disposed axially between the first sleeve bearing and the second sleeve bearing, and the opposite end collar includes a lubrication bore that extends axially therethrough with a stopper disposed therein.

5. The cartridge pin assembly of claim 1, wherein the annular frustoconical groove defines an axial taper of less than 15 degrees.

6. The cartridge pin assembly of claim 5, wherein the end collar overlaps the annular frustoconical groove a minimum axial distance that ranges from 0.05 mm to 3.0 mm.

7. The cartridge pin assembly of claim 1, wherein the end collar is deformed such that a deformed amount of material is swaged into the annular frustoconical groove at least 325 degrees along the circumferential direction.

8. The cartridge pin assembly of claim 7, wherein the end collar is deformed such that a deformed amount of material is swaged into the annular frustoconical groove a full 360 degrees along the circumferential direction.

9. The cartridge pin assembly of claim 1, wherein the end collar includes a shoulder portion.

10. The cartridge pin assembly of claim 2, wherein the end portion of the pin extends axially past the end collar a first predetermined distance, and the opposite end portion of the pin extends past the opposite end collar a second predetermined distance that is within 0.2 mm of the first predetermined distance.

11. The cartridge pin assembly of claim 10, wherein the first predetermined distance and the second predetermined distance ranges from 2.6 mm to 2.8 mm.

12. A track chain assembly including a plurality of swaged joints, each joint comprising:
a track link including an inboard end collar with a first bore therethrough and an outboard end collar with a pin boss extending outwardly therefrom and a second bore therethrough, the pin boss including an outer side surface; and a cylindrical pin defining a cylindrical axis, a radial direction, and a circumferential direction, the cylindrical pin including an end portion being pressed and nonrotatably mounted into a respective second bore of the outboard end collar;

wherein an annular frustoconical groove is formed in the end portion of the cylindrical pin disposed axially and radially adjacent to the pin boss, and the pin boss has at least one continuously-swaged deformation that is disposed in the annular frustoconical groove such that an angular filled undercut portion of the pin boss that extends into the annular frustoconical groove circumferentially at least 290 degrees about the cylindrical axis, locking the cylindrical pin within the track link.

13. The track chain assembly of claim 12, wherein the at least one continuously-swaged deformation is split into a plurality of swaged deformations that are spaced circumferentially apart from each other.

14. The track chain assembly of claim 12, wherein the angular filled undercut portion extends circumferentially at least 325 degrees about the cylindrical axis.

15. The track chain assembly of claim 12, the track chain assembly including a plurality of sleeve bearings, wherein an individual sleeve bearing is located within the first bore of the inboard end collar.

16. The track chain assembly of claim 15, the track chain assembly further including a plurality of thrust rings and a plurality of seal assemblies, wherein the individual sleeve bearing is bounded by an individual thrust ring housed within the outboard end collar on a first side and an individual seal assembly, located within the inboard end collar, on a second side.

17. A track chain assembly including swaged joints comprising:

a track link, the track link including an inboard end collar with a first bore and an outboard end collar a second bore, wherein the outboard end collar also includes an outer side surface and a pin boss extending from the outboard end collar to the outer side surface;

a track pin, the track pin including an end portion with an annular frustoconical groove and the track pin defining a cylindrical direction, a radial direction, and a circumferential direction; and a track bushing disposed about the track pin, wherein the end portion of the track pin is pressed and nonrotatably mounted into the second bore, the annular frustoconical groove is disposed axially and radially adjacent to the pin boss, and the pin boss has a continuously-swaged deformation that is disposed in the annular frustoconical groove such that an angular filled undercut portion of the pin boss extends into the annular frustoconical groove circumferentially at least 290 degrees along the cylindrical direction.

18. The track chain assembly of claim 17, wherein the angular filled undercut portion locks the track pin within the annular frustoconical groove.

19. The track chain assembly of claim 17, wherein the angular filled undercut portion extends circumferentially at least 325 degrees about the cylindrical direction.

20. The track chain assembly of claim 17, wherein the annular frustoconical groove defines an axial taper of less than 15 degrees.

21. The track chain assembly of claim 17, wherein the track pin has a generally cylindrical shape.

* * * * *